Figure 1:
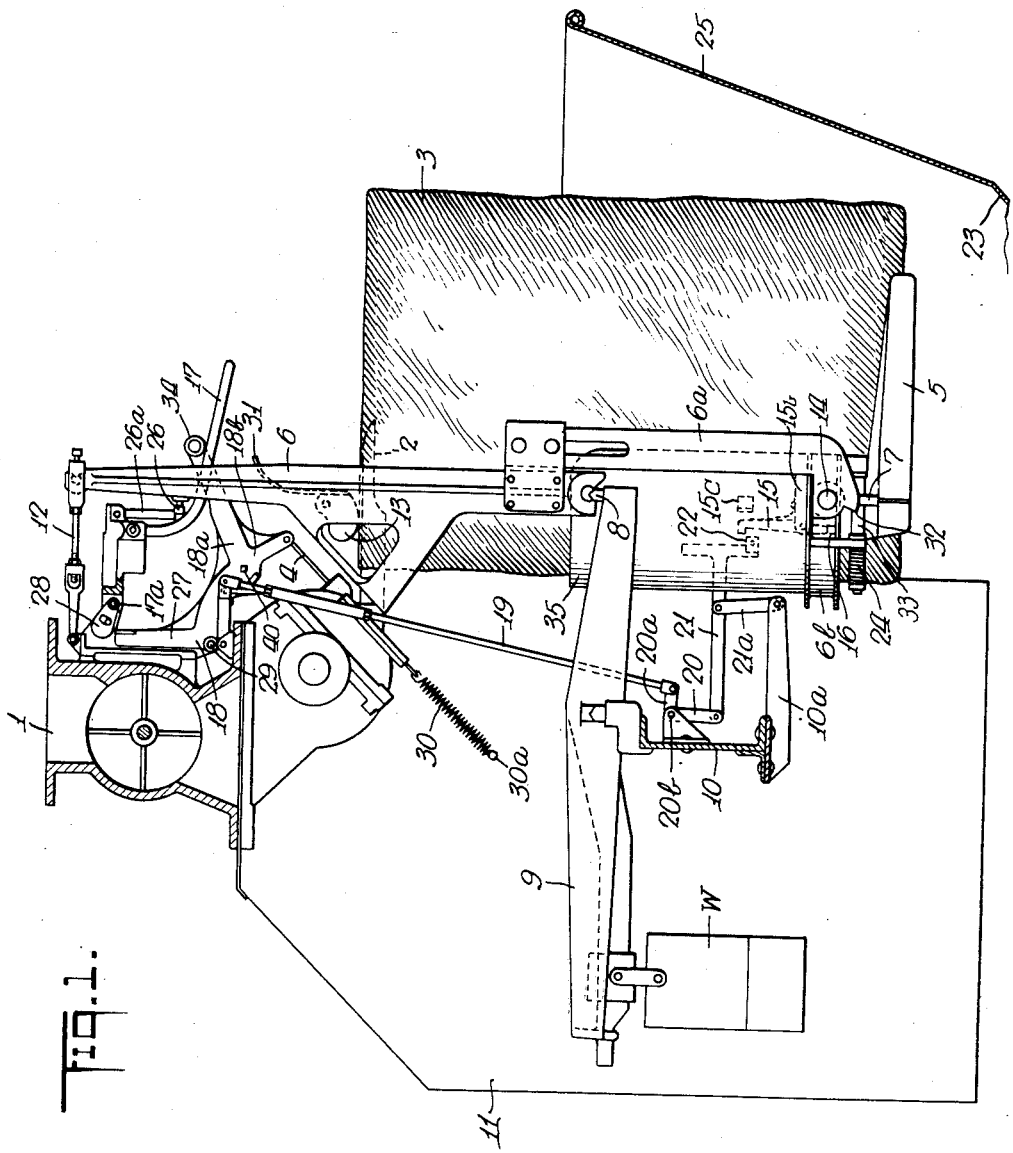

April 27, 1943.  G. W. TALBOT  2,317,865
AUTOMATIC BAG FILLING AND WEIGHING MACHINE
Filed Sept. 10, 1940    5 Sheets-Sheet 2

INVENTOR
Geoffrey William Talbot
BY
ATTORNEY

April 27, 1943.   G. W. TALBOT   2,317,865
AUTOMATIC BAG FILLING AND WEIGHING MACHINE
Filed Sept. 10, 1940   5 Sheets-Sheet 3

INVENTOR
Geoffrey William Talbot
BY
ATTORNEY

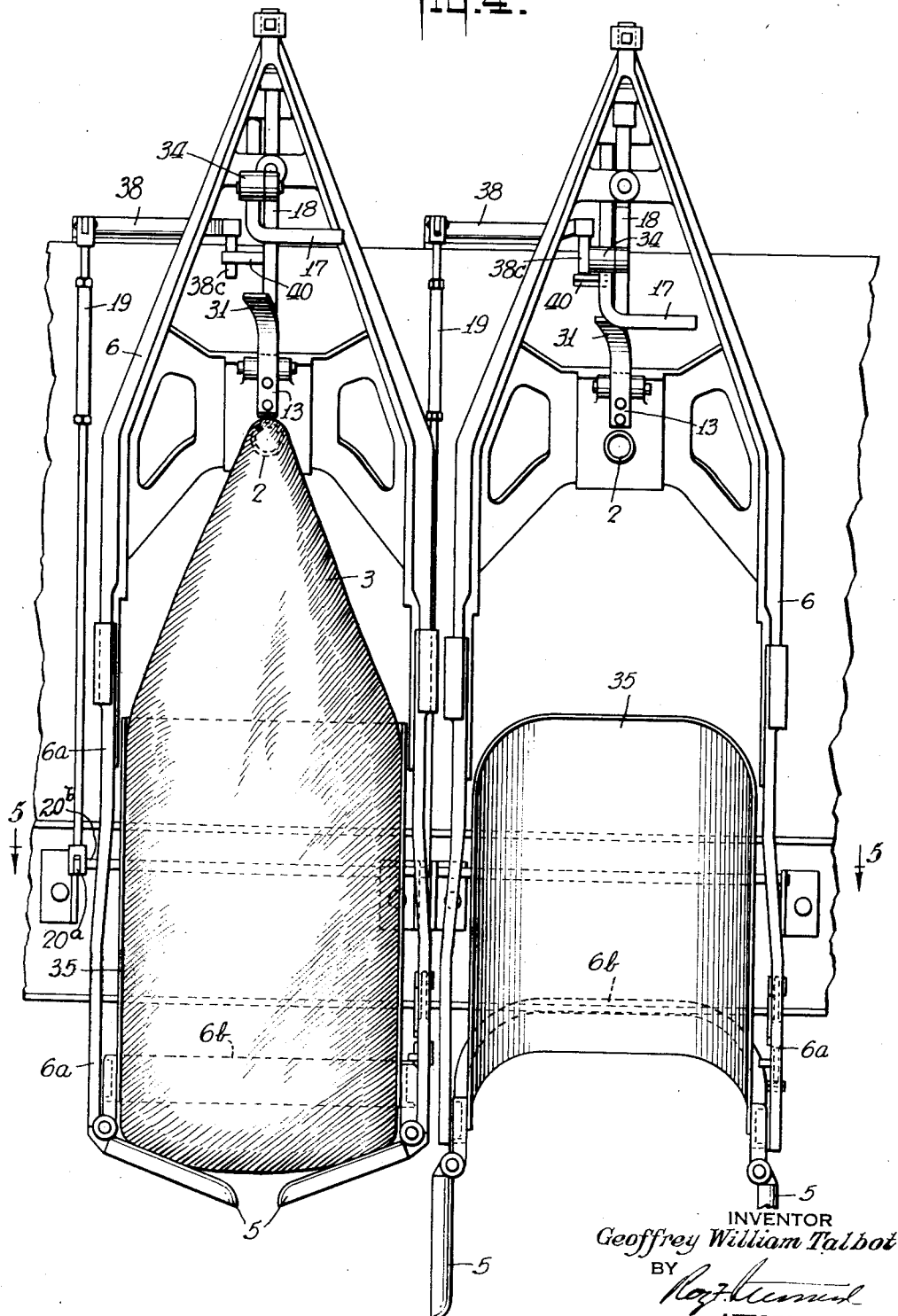

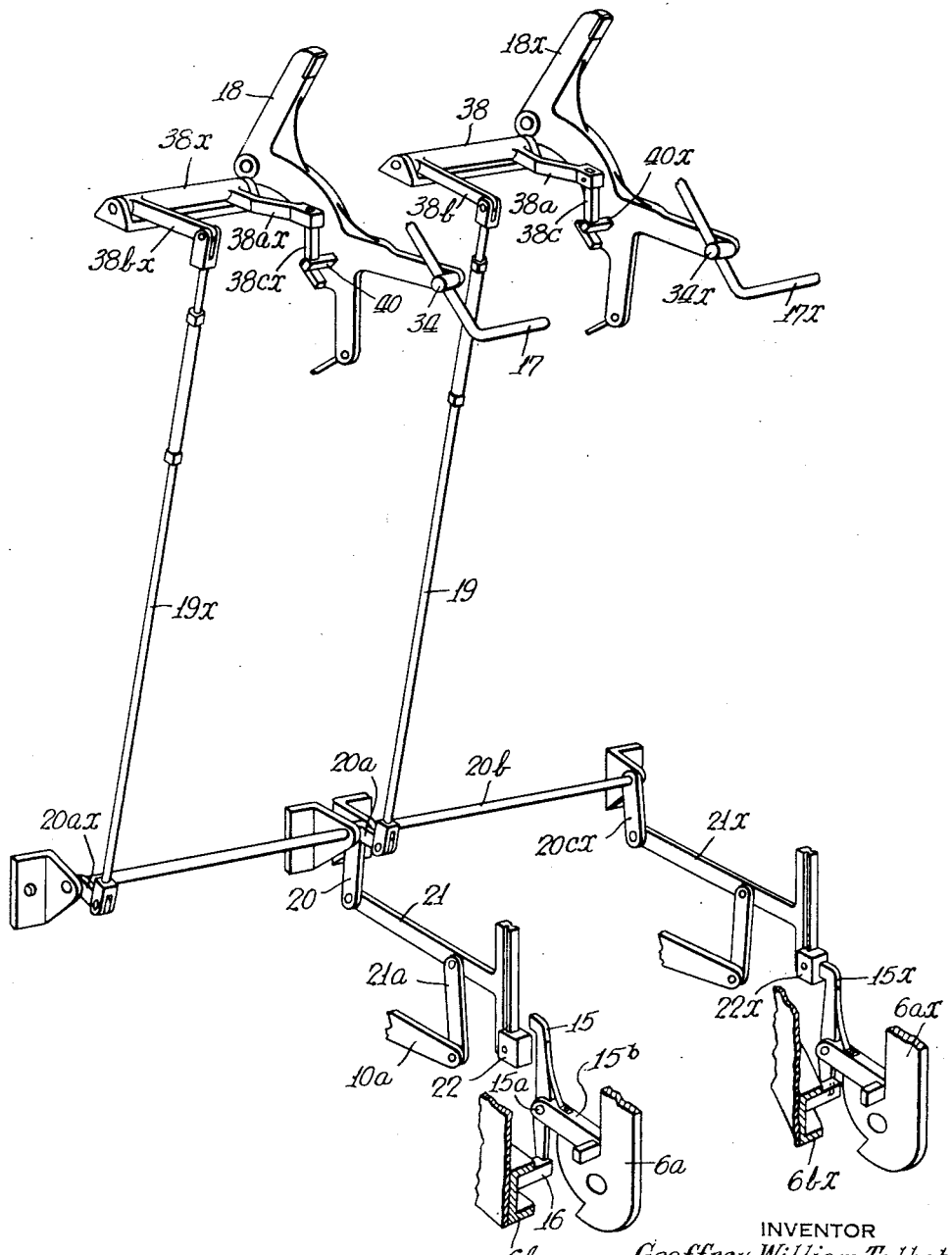

Patented Apr. 27, 1943

2,317,865

UNITED STATES PATENT OFFICE 2,317,865

AUTOMATIC BAG FILLING AND WEIGHING MACHINE

Geoffrey William Talbot, Buxton, England, assignor to Imperial Chemical Industries Limited, a corporation of Great Britain Application September 10, 1940, Serial No. 356,227
In Great Britain July 16, 1939

8 Claims. (Cl. 249—60)

This invention relates to bag filling and weighing machines of the kind in which the bag is supported on a scale pan carried by a frame in which the bag is positioned during filling from a spout delivering powdered or granular material into the bag, and in particular to improved means for discharging filled bags from such machines.

With machines at present in use the filled bags are drawn off the filling spout by hand onto a belt conveyor or trolley. This requires considerable physical effort on the part of the operator and the time taken by the necessary movements imposes a limitation on the output of the machine. Further, when the bags are drawn off the front of the machine this part of the machine must be left completely open, and consequently the operator is not protected from dust ejected from the filling spout or from burst bags. With materials such as hydrated lime or cement, the effects of dust may be very distressing to the operator and may seriously reduce his efficiency.

One object of the present invention is to provide a bag filling and weighing machine the operation of which requires less physical effort than in the case of known machines of similar type. Another object is to increase the output of the machine by reducing the time taken by the movements of the operator in controlling the machine, and in particular in discharging the filled bags. Another object is to provide a machine which will afford increased protection to the operator from dust. Further objects will appear hereinafter.

According to my invention, in a bag filling and weighing machine of the kind in which the bag is supported on a scale pan carried by a frame in which the bag is positioned during filling from a spout delivering powdered or granular material into the bag, the bottom of the scale pan is collapsible, the arrangement being such that the bottom of the scale pan can be collapsed when the correct weight is reached, whereupon the bag falls freely from the frame. Usually a chute is provided to receive the filled bags, and at the bottom of the chute a conveyor is arranged to carry the filled bags away. Preferably the collapsible bottom of the scale pan is spring-controlled so that when the bag has fallen from the frame the collapsible bottom is automatically returned to the uncollapsed position. The bottom of the scale pan may consist of two hinged flaps normally retained in the uncollapsed position by means which can be released when the filled bag is ready for discharge.

In one form of machine according to the invention the filling spout is arranged so as to project sideways into the top of the bag to be filled (which is usually provided with a non-return valve) and the scale pan is adapted to tilt so as to free the bag from the spout before the bottom of the scale pan collapses, means being provided for preventing tilting of the scale pan during filling of the bag until the correct weight is reached. Such means may be positive mechanical means such as a trigger mechanism or they may consist in a bag clamping device which presses the top of the bag on to the spout and thereby anchors it against outward tilting movement. In one arrangement the scale pan is pivoted in the frame in such a position that the weight of the bag tends to tilt the scale pan, the scale pan being provided with a back member embracing the filled bag and tilting with the scale pan to carry the top of the bag clear of the spout. The tilting of the scale pan may be caused to release the means for retaining the bottom of the scale pan in the uncollapsed position.

If desired the means controlling the collapsing, or tilting and collapsing, of the scale pan may be subject to hand operation. Thus in a machine adapted for filling and weighing, in succession, a number of bags on a row of separate scale pans with collapsible bottoms, hand-operated means may be provided controlling the collapsing, or tilting and collapsing, of each scale pan, including a lever or switch which starts the flow of material through the spout on which an empty bag has been placed and also releases means preventing the collapsing, or tilting and collapsing, of the scale pan carrying the bag the filling of which has just been completed. In this way it is ensured that two bags are not discharged at the same time, which might cause jamming of the conveyor on to which the bags fall. Further, no bag can be removed from the spout until its contents are of the correct weight.

In a preferred form of the machine a chute is provided to receive the bag as it drops from the frame, and the wall of the chute is extended upwardly in front of the machine to a height such that the operator has sufficient room to insert fresh bags on the spout or spouts but is protected from material spilled from any burst bags.

One form of the invention applicable either to a single machine or to a machine for filling a plurality of bags seriatim, is illustrated in the accompanying drawings, in which Fig. 1 is a side elevation, partly in section of a bag-filling and weighing mechanism, illustrating the positions of the parts while a bag is being filled and with the scale-pan device in its raised or uppermost position.

Figure 2:
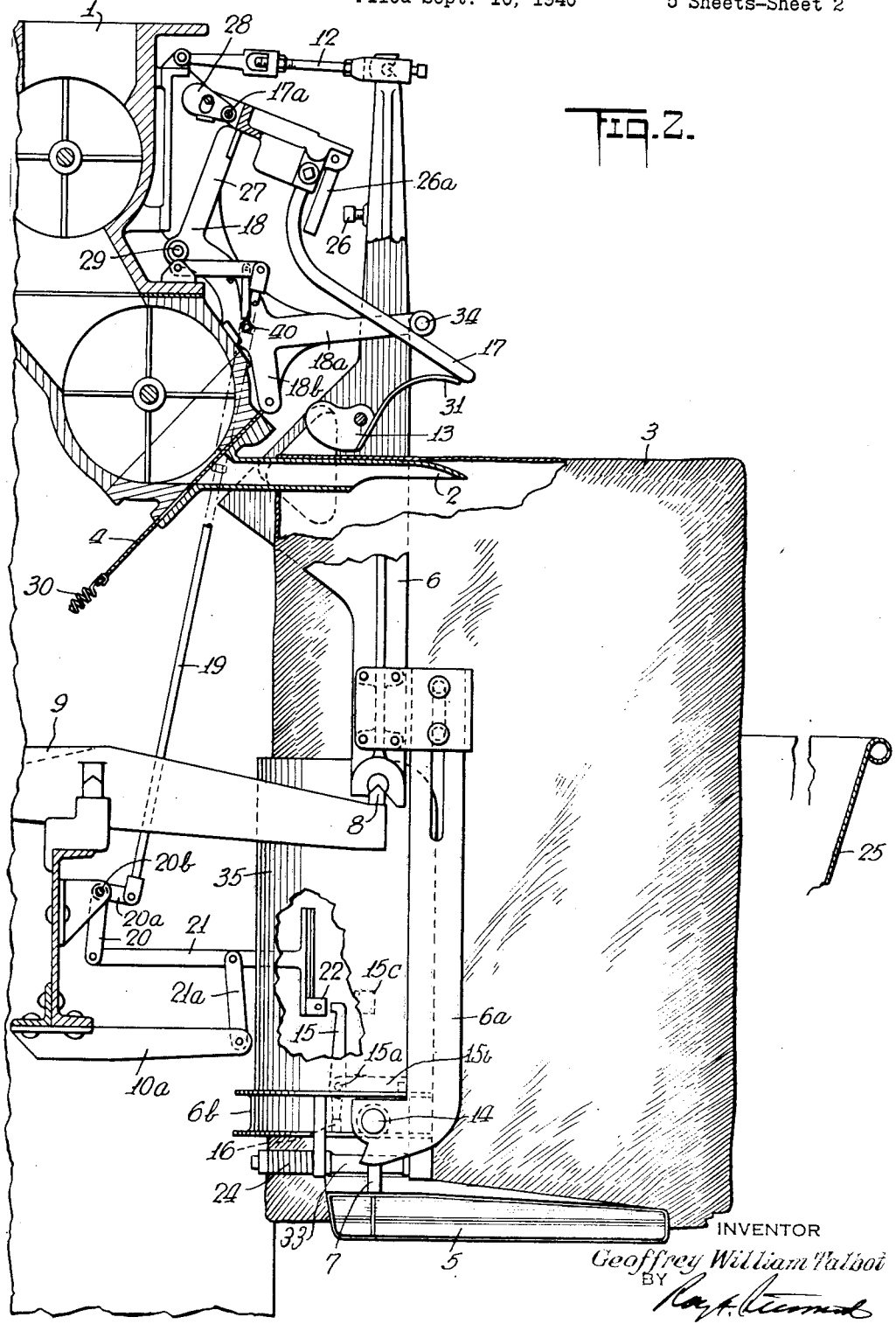

Fig. 2 is a similar view of the mechanism illustrating the positions of the parts at the moment when the bag has been filled completely, the scale-pan device has dropped and the apparatus is in position to permit unlatching of the tiltable portion of the bag-supporting platform device.

Figure 3:
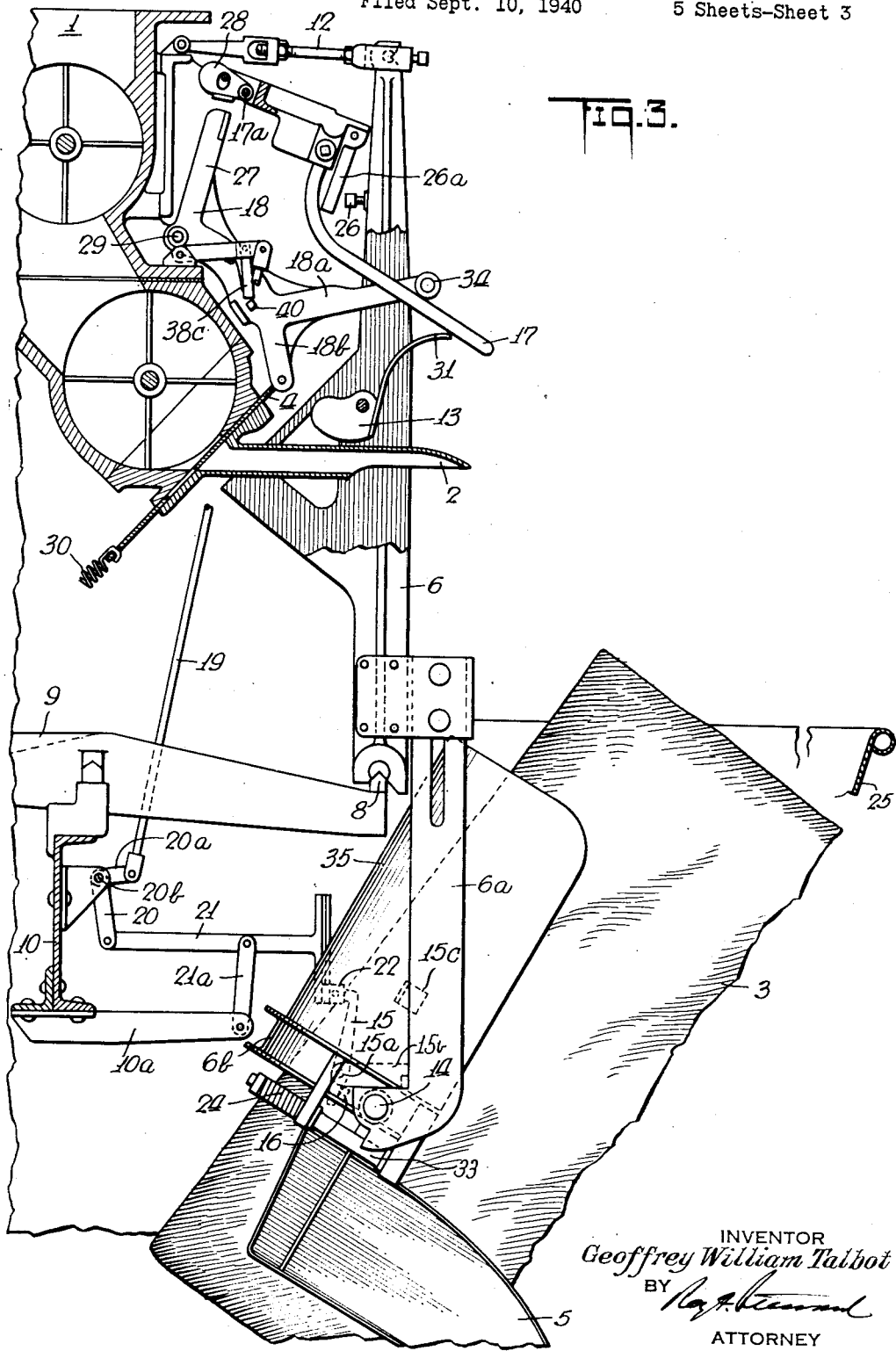

Fig. 3 is a side elevation, on an enlarged scale, partly in section and partly broken away, illustrating the positions of the parts at the moment of discharge of the bag, the elements which cause the unlatching of the tiltable bag-supporting platform device being shown as not yet returned to their normal positions. It is to be understood, however, that this is only for purposes of explanation, since in actual practice the said elements return quickly to normal position, even before the bag is discharged. The upper portion of this figure shows the parts of the second or right hand machine of Fig. 4, ready to receive an empty bag. The lower part of said Fig. 3 shows a part of the left hand machine of Fig. 4 with a part of the filled bag ready to be discharged, the latch mechanism for said left hand machine being shown in dotted lines.

Fig. 4 is a somewhat diagrammatic front elevation of an apparatus illustrating a machine having two bag-filling and weighing mechanisms side by side, and Fig. 5 is a diagrammatic view in perspective, on a somewhat exaggerated scale for purposes of explanation hereinafter of the manner in which the tilting and collapsing of the bag-supporting mechanism may be controlled. In this view the corresponding parts of two adjacent machines have the same reference letters, except that those of the right-hand machine of Fig. 4 are distinguished by the added letter $x$ in order to simplify the explanation.

Referring to the drawings, the principal elements of a single bag-filling and weighing mechanism will first be described, it being understood that in an apparatus embodying a plurality of such mechanisms they are all alike in their principal elements, so that a description of one will serve for all.

Referring to Figure 1, the material to be filled into the bags falls from a hopper (not shown) into the feeding passage 1 through which it is fed by the usual rotary feeding devices, to the spout 2 which projects sideways into the bag 3 to be filled. A slide 4 is provided to cut off the feed when the correct weight has been attained.

The bag 3 is carried by a bag-supporting device comprising a hanger, carrying a tiltable and collapsible bag-supporting scale-pan device. As shown in the drawings, the hanger consists of an upper part 6, and a lower part 6a, which may be adjusted relative to the upper part by slot and bolt connection to adjust the machine for bags of different sizes.

The scale-pan device, which considered as a whole may tilt relative to the hanger and also collapse to allow a bag to drop, comprises a tiltable member and a collapsible bottom or platform. The tiltable member, in this case formed as a generally U-shaped frame, 6b, is mounted in the lower part 6a of the hanger so that it may have an angular movement of itself with the accompanying bottom in a direction such that the scale-pan device may move from a position where it can support a bag during the filling operation to a position where it tilts the bag to free its upper end from the spout. In the construction illustrated, the tiltable member 6b is provided with pivot pins or trunnions journaled in bearings in the lower part 6a of the hanger, one of said pivot pins or trunnions being shown at 14, Fig. 1, there being a corresponding pivot pin or trunnion on the opposite side of the tiltable frame.

The collapsible bottom is suitably connected to the tiltable member 6b so as to allow of an angular movement of the bottom in a direction transverse to the longitudinal axis of the spout, so that the said bottom may move from a position where it can form a platform to support a bag during the filling operation to a downward position, when it is collapsed to discharge the bag. In the embodiment of the invention shown in the drawings the bottom consists of two flaps 5, each suitably hinged, as indicated at 33, to the respective side members of the tiltable frame 6b, so that each flap can drop downward from a bag-supporting position to a collapsed position, whereby the bag, then in an inclined position, is free to fall downward from the machine. The collapsible bottom and the tiltable member constitute a bag-supporting scale-pan device which can tilt to release a filled bag from the filling spout 2, and then collapse to allow the bag to drop from the machine.

The entire bag-supporting device is carried by a scale-mechanism in the usual way, as for example by pivoting the hanger frame on arms of the scale mechanism, one of which arms, resembling a steelyard, is indicated at 9, with its pivotal point arranged as indicated at 8.

The frame is guided at the upper end by a link 12, pivoted at one end to the machine frame and at the other end to the hanger frame.

The scale mechanism is indicated somewhat diagrammatically in the drawings. One of its lever arms 9 is illustrated as pivotally supported on a rigid cross-member 10 of the casing 11 of the machine. Suitable weights for the scale mechanism are indicated at W, Fig. 1.

Suitable means of a well known type for retaining the bag-supporting device in its raised position for filling a bag and for allowing the said device to descend to a lower position when the bag is filled, for automatically shutting off the supply of material to the spout or nozzle, and for releasing the bag clamp, are illustrated in Figs. 1 and 2 of the drawings. The details of this part of the machine constitute no part of the present invention and hence need be only briefly described, as follows:

The upper part of the hanger 6 is arranged to hold in its raised position a lever 17, by means of a trigger mechanism which includes a stop 26, carried by said hanger part 6, arranged to engage a trigger arm, indicated at 26a. The trigger arm is pivoted to a lever indicated at 17, which is fulcrumed on the machine as at 17a in the usual way and carries a weighted member 28 also pivoted at 17a and having a notch or shoulder to engage the upper end of one arm 27 of a three-armed lever 18, also fulcrumed on the machine, as indicated at 29.

A second arm 18a of lever 18 extends to the front of the machine and has a lateral projection 34 which can engage the upper side of the lever 17.

The third arm 18b of the lever 18 is connected to a slide or cut-off device 4. The lower end of this device is connected to one end of a tension spring 30 whose other end is attached to a part of the machine frame as indicated at 30a. The tendency of the spring 30 is to close the cut-off device and to pull down the three-armed lever 18, this being prevented, when the lever 18 is set in its raised position and the cut-off is open, because of the engagement between the weighted notched member 28, and the upper end of the upper arm of lever 18.

The weighted member 28 will be released from engagement with the upper arm of lever 18 when lever 17 is dropped. This cannot occur so long as the trigger arm 26a rests on the stop 26 carried by the hanger frame in the position indicated in Fig. 1. However, as soon as the weight of the filled bag overcomes the scale weight and the bag moves the hanger parts 6 and 6a far enough downward to withdraw the stop from the orbit of the bottom end of the trigger arm, the lever 17 drops, lifts the weighted member 28, and releases the three-armed lever 18, which drops, aided by the spring 30, whereby the cut-off slide 4 is closed to shut off the supply of material.

For the purpose of clamping the empty bag to the spout or nozzle 2, a swinging cam 13 is provided, this having an arm 31 which is in the path of the lever 17, so that as this falls, the cam 13 will be raised from its position where it presses the bag against the spout 2. When the arm 31 is freed by lifting the lever 17, in resetting the apparatus the weight of the cam 13 will cause it to fall into its clamping position.

It will be seen that with a mechanism such as described and a tiltable and collapsible bag-supporting scale-pan device, the latter will be lowered when the bag it supports has been filled to the correct weight, and then the bag can be released from the spout by tilting the scale-pan device and thereafter will be discharged downward by collapsing the bottom.

In order to prevent the tilting and collapsing of the bag-supporting scale-pan device during the filling operation and to allow such tilting and collapsing when the bag is completely filled to the required weight, suitable latch mechanism is provided for retaining the tiltable member 6a in its bag-filling position. In the present apparatus, an ordinary swinging detent lever 15 is provided, this being pivoted at 15a on an arm 15b suitably fixed to the lower part 6a of the hanger, this swinging detent lever being biased to remain in its erect position, in the usual manner, either by having its center of gravity below its pivotal axis or by a biasing spring. A stop carried by the back member 35 may be provided to limit the movement of the detent lever 15, as indicated at 15c, Fig. 1.

The swinging detent lever 15 in its normal erect position has its lower end resting just above a stop 16 secured to the tiltable member 6b in such a position that the said frame cannot be tilted until the detent lever 15 has been swung out of the orbit of the stop 16. For the purpose of swinging the detent lever 15, a striker rod 21 is provided, which rod carries a striker knob 22, arranged to strike the upper end of the detent lever 15 only when the scale-pan is in its lowermost position. The upper end of said detent lever has an overhanging extension which is engaged by the nose 22 only when said extension and said nose are in proper alignment, this occurring only when a bag has been filled to its correct weight and the scale pan device has fallen to its lowest position. The movement of the knob 22 is substantially horizontal and is limited so that unless it is opposite the over- hanging extension of the detent lever 15 it cannot swing said lever to release the tiltable member 6b but will merely move idly in the space below the said overhanging extension. In other words, the movement of the knob 22 horizontally is less than the length in a horizontal direction of the underside of said overhanging extension. The rod 21 is suitably carried by the machine frame, as by a link 21a supported by a bracket 10a from the cross-piece 10 of the machine frame.

The means for moving the striker arm 21 will be referred to hereinafter.

In order to prevent the collapsing of the bag-supporting bottom, during the filling operation, each flap 5 is provided with a stop or nose 7 which engages the rounded bottom surface of the lower part 6a of the hanger until the tilting of the tiltable member 6b has caused the nose 7 of each flap to ride off the said rounded bottom surface of the part 6a until it is opposite a notched or cut away portion 32 of said part 6b, whereupon the nose 7 enters said notch and the flap collapses. Each flap is acted upon by a coil-spring, one of which is indicated at 24, which tends to return its flap to its bag-filling position but is not strong enough to withstand the load on its flap due to a filled bag.

With the type of apparatus illustrated in the drawings, the operation of filling and weighing a bag is as usual and need be only briefly described, as follows:

With the lever 17 dropped down, an empty bag may be slid onto the spout or nozzle 2, the clamping cam 13 being in its lifted position. Then the lever 17 is raised by hand, thus also raising the lever 18, because of the lateral extension 34 which rides on the lever 17.

The lever 18 is latched in its raised position by the weighted member 28 which lifts to allow the upper end of arm 27 to ride under it, and drops to engage said upper end, in the usual way. At the same time, the trigger arm 17a comes to rest on the stop 26 as indicated in Fig. 1. The lifting of the three-armed lever 18 moves the cut-off slide 4 to its open position, thereby admitting the material to be bagged to the spout and thence to the bag.

When the bag has filled to the point where its weight overcomes the action of the weight W carried by the scale mechanism, the whole bag-supporting device descends, thereby lowering the stop 26, carried by the upper part of the hanger, so as to free the trigger-arm 17a and allow the lever 17 to drop, thus lifting the weighted member 28, and releasing it from the upper end of the arm 27 of the three-armed lever 18, which then also drops, being aided by the action of the spring 30, which closes the cut-off slide 4 and shuts off the supply of material to the bag. The bag-clamping cam 13 is raised by the dropping of lever 17 which strikes the arm 31 carried by the cam 13.

When the bag-supporting device reaches its lowest position, the extension at the upper end of the detent lever 15 comes into alignment with the knob 22 of the striker rod 21, as shown in Fig. 2. If, now the rod 21 be moved enough to cause its knob to strike the extension constituting the top end of the swinging detent lever 15 and swing it so that its lower end moves out of contact with the pin or block 16 on the tiltable member 6b, the latter is then free to be tilted and, as the flaps 5 are carried by the tiltable member, they, as well as the back-member 35, may be tilted to carry the filled bag away from the spout or nozzle 2. The positions of the parts will be as shown in Fig. 3.

When the tiltable member 6b and its flaps have been tilted to the full extent of their movement, the flaps are released, as hereinbefore described, and collapse, thus freeing the tilted bag and allowing it to be discharged from the machine.

When the flaps 5 are returned to their closed position by the springs 24, and they and the tiltable member 6b have been swung into the bag-filling position, each flap will be held in this position by contact of its nose 7 with the rounded bottom surface of the hanger part 6a, and the whole scale pan device will be latched in the bag-filling position by the swinging detent lever 15 engaging the pin or block 16 on the tiltable frame, it being understood that the striker knob 22 was withdrawn so soon as it completed the unlatching operation.

In the embodiment of the invention illustrated, the striker arm 21 is moved toward and from the detent lever 15 by means of a rod 19 suitably connected to the striker rod 21 so that an upward pull on the rod 19 will move the striker knob 22 toward and into contact with the detent lever 15.

With a single machine, the rod may be pulled up directly by hand in any suitable way, but in a machine for filling a plurality of bags, it is more convenient to have the rod 19 of one machine actuated by the upward movement of lever 17 of the adjacent bag-filling and weighing machine, so that when the operator has put a bag on the spout of the empty machine and raises the lever 17 of that machine to start the filling operation, the raising of such lever 17 will pull upward the rod 19 of the companion machine and thereby trip the swinging detent lever of said companion machine, if it has a completely filled bag.

The means for lifting the rod 19 by the lever 17 may include a trigger mechanism of the type indicated at 26 and 17a, suitable bell-crank devices being employed where necessary.

For the purpose of clearer explanation, reference is made to Fig. 5, and to avoid confusion it is well to designate the lever 17 of the left hand machine as 17 and that of the other machine as 17x, so that one may be distinguished from the other. This figure of the drawings is a diagrammatic perspective view of a usual trigger mechanism and bell-crank devices giving a cross-connection between the adjacent machines, the parts for the left-hand machine of Fig. 4 being given the usual reference letters and those for the right machine being given the same reference letters with an affixed additional letter x. For convenience of illustration, it is assumed that the left hand machine is in the position where it has discharged its bag, and lever 17 is down ready for the placing of an empty bag. The right hand machine is assumed to have just filled a bag and to be ready to discharge it.

The operator places an empty bag on the spout of the left hand machine. Then he raises the lever 17 to lift lever 18 and open the cut-off slide for the said left hand machine. As he raises lever 17, the latter, through suitable connections momentarily pulls up the rod 19x and then drops it again. The rod 19x, when pulled up, pushes the striker rod 21x to bring its knob 22x against the extended end of the detent lever 15x and thereby releases the tiltable frame 6bx, which may then be tilted to free its bag from the spout and allow the collapse of the bottom to discharge the bag.

For the purpose of momentarily lifting the rod 19x, the three-armed lever 18, which is lifted by lever 17, carries a stop 40 which catches under the end of a trigger arm 38cx carried by a crank arm 38ax connected to the shaft 38x on which an arm 38bx is fixed, this arm 38bx being pivotally connected to the rod 19x which connects with one arm 20ax of a bell-crank device fixed on a shaft 20b to which the other arm 20cx of said bell-crank device is fixed, the latter arm 20cx being connected to the striker rod 21x.

When the lever 17 is raised to start the filling operation of its machine, it raises arm 18, whose pin 40 catches under the trigger arm 38cx and lifts it, moving the crank arm 38bx a short distance upward until the orbit of the pin 40 no longer intersects the orbit of the end of the trigger arm 38cx, after which the crank arm 38bx drops because of its own weight and that of the rod 19x connected to it.

The connection between the lever 17x of the right hand machine and the unlatching mechanism of the left hand machine by which the swinging detent lever is tripped is substantially the same, except that the bell-crank arm 20 is integral with its arm 20a, and the bell-crank formed by the said two arms is loose on the shaft 20b.

By pushing up the lever 17x the rod 19 will be lifted up momentarily to release the detent lever 15, if the bag in the left hand machine, Fig. 4, has been completely filled and the bag-supporting scale-pan device has dropped to its lowest position, so as to align the striker knob 22 and the extension on the end of said detent lever 15.

In the best embodiment of the invention, the pivotal axis of the tiltable frame is not under the center of gravity of the filled bag, whereby when the detent lever 15 of a machine has been released from the stop 16, the tiltable frame will be tilted by the weigth of the bag it supports, the bottom will then collapse and discharge the bag, whereupon the flaps will be returned by their springs 24, and the tiltable frame can return to its bag-filling position.

A chute 23 is provided to catch a bag immediately on its discharge and conduct to a suitable conveyor. This chute has a wall extended upward into close proximity to the outer side of the tilted bag, so that the drop of the bag to the chute wall is relatively small, so that the danger of injury to the bag is reduced, thereby permitting the use of lighter bags.

The front of the machine is partly closed in as shown at 25, thus protecting the operator from dust spilled from the filling spout and from burst bags.

It will be appreciated that the machine is capable of being readily adapted for weighing material in different size bags, by varying the length of the frame side members.

As many widely different embodiments of this invention may be made without departing from the spirit or scope thereof, it is to be understood that I do not limit myself to the specific embodiments thereof, except as defined in the appended claims.

I claim:

1. In a bag-filling and weighing machine, comprising a scale-mechanism, a filling spout arranged to enter the side of a bag, means for supplying material to be bagged to said filling spout, a cut-off device arranged to control the supply of material to the spout, a scale-pan hanger supported by the scale-mechanism so as to rise and fall, releasable means for clamping a bag to the spout, and means for holding the cut-off device open, said holding means and said bag-clamping means being released when the hanger descends, to allow the cut-off device to be closed, the combination, with said hanger, of a bag-supporting scale pan device comprising a tiltable member carried by the hanger and angularly movable with relation thereto in a direction to free a filled bag from the spout, a bag-supporting collapsible bottom carried by said tiltable member and angularly movable with relation thereto to discharge a bag, and means for retaining the collapsible bottom against collapse during the filling of the bag, said means being released upon the tilting of the tiltable member.

2. In a bag-filling and weighing machine, comprising a scale-mechanism, a filling spout arranged to enter the side of a bag, means for supplying material to be bagged to said filling spout, a cut-off device arranged to control the supply of material to the spout, a scale-pan hanger supported by the scale-mechanism so as to rise and fall, and means for holding the cut-off device open, said holding means being released when the hanger descends, to allow the cut-off device to be closed, the combination, with said hanger, of a bag-supporting scale-pan device comprising a tiltable member carried by the hanger and angularly movable with relation thereto in a direction to free a filled bag from the spout, a bag-supporting collapsible bottom carried by said tiltable member and angularly movable with relation thereto to discharge a bag, and means for retaining the collapsible bottom against collapse during the filling of the bag, said means being released upon the tilting of the tiltable member, means for latching the tiltable member in its position for bag-filling, and means for releasing said latching means.

3. In a bag-filling and weighing machine, comprising a scale-mechanism, a filling spout arranged to enter the side of a bag, means for supplying material to be bagged to said filling spout, a cut-off device arranged to control the supply of material to the spout, a scale-pan hanger supported by the scale-mechanism so as to rise and fall, and means for holding the cut-off device open, said holding means being released when the hanger descends, to allow the cut-off device to be closed, the combination, with said hanger, of a bag-supporting scale-pan device comprising a tiltable member carried by the hanger and angularly movable with relation thereto in a direction to free a filled bag from the spout, a bag-supporting collapsible bottom carried by said tiltable member and angularly movable with relation thereto to discharge a bag, means for retaining the collapsible bottom against collapse during the filling of the bag, said means being released upon the tilting of the tiltable member, means movable with the hanger for latching the tiltable member in its position for bag-filling, and means for releasing said latching means when the hanger and scale-pan device have descended to their lowest positions.

4. In a bag-filling and weighing machine, comprising a scale-mechanism, a filling spout arranged to enter the side of a bag, means for supplying material to be bagged to said filling spout, a cut-off device arranged to control the supply of material to the spout, a scale-pan hanger supported by the scale-mechanism so as to rise and fall, and means for holding the cut-off device open, said holding means being released when the hanger descends, to allow the cut-off to be closed, the combination, with said hanger, of a bag-supporting scale-pan device comprising a tiltable member carried by the hanger and angularly movable with relation thereto in a direction to free a filled bag from the spout, and a bag-supporting collapsible bottom carried by said tiltable member and angularly movable with relation thereto to discharge a bag: means for retaining the collapsible bottom against collapse during the filling of the bag, said means being released upon the tilting of the tiltable member, means movable with the hanger for latching the tiltable member in its position for bag-filling, and manually operable means carried by the machine frame for releasing said latching means, when the hanger and scale pan device have descended to their lowest positions.

5. A bag-filling and weighing machine according to claim 1, in which the axis about which the tiltable member tilts, is back of the center of gravity of the bag when filled, so that the scale-pan device will be tilted by the weight of said filled bag when the means for retaining it against tilting has been released.

6. A bag-filling and weighing machine according to claim 1, in which the axis, about which the tiltable member tilts, is back of the center of gravity of the bag when filled, so that the scale-pan device will be tilted by the weight of said filled bag when the means for retaining it against tilting has been released, said tiltable member carrying a back-member tilting with it to aid in carrying the top of the bag clear of the spout.

7. In a bag-filling and weighing apparatus comprising at least two bag-filling and weighing machines arranged side by side, each machine comprising a scale-mechanism, a filling spout arranged to enter the side of a bag, means for supplying material to be bagged to said spout, a cut-off device arranged to control the supply of material to the spout, a scale-pan hanger supported by the scale-mechanism so as to rise and fall, means for holding the cut-off device open, said holding device being released when the hanger descends, to allow the cut-off device to be closed, manual means for resetting the cut-off device to its open position, a bag-supporting scale-pan device comprising a tiltable member carried by the hanger and angularly movable with relation thereto in a direction to free a filled bag from the spout, a bag-supporting collapsible bottom carried by said tiltable member and angularly movable with relation thereto to discharge a bag, and means for retaining the collapsible bottom against collapse during the filling of a bag, said means being released upon the tilting of the tiltable member, the combination, with means in each machine movable with the hanger and scale-pan device for latching the tiltable frame in its position for bag-filling, of releasing means for each machine for releasing its latching means when the hanger and scale-pan device are in their lowest positions, and connections intermediate the manual means for resetting the cut-off device of one machine and the latch releasing means of another machine for actuating said releasing means to allow a bag to be discharged.

8. In a bag-filling and weighing machine, a spout, a scale-pan hanger, a tiltable and collapsible scale-pan device comprising a tiltable member pivotally mounted in the hanger for angular movement to free a bag from the spout and a collapsible bottom consisting of two flaps, each hinged to the tiltable member to allow the flaps to collapse downward to discharge a bag, latching means movable with the hanger for retaining the tiltable member in its position for bag-filling, means for releasing said latching means only when the hanger and scale-pan device are in their lowest positions, and means released by the tilting of the tiltable member for retaining the bottom flaps in their bag-filling positions.

GEOFFREY WILLIAM TALBOT.